United States Patent
Hayashi et al.

(10) Patent No.: US 12,476,919 B2
(45) Date of Patent: Nov. 18, 2025

(54) COMMUNICATION SYSTEM, COMMUNICATION CONTROL APPARATUS, COMMUNICATION CONTROL METHOD, AND RECORDING MEDIUM

(71) Applicant: Mitsubishi Electric Corporation, Tokyo (JP)

(72) Inventors: Tomoyuki Hayashi, Tokyo (JP); Takayoshi Tonomura, Tokyo (JP); Takamitsu Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/569,489

(22) PCT Filed: Sep. 28, 2021

(86) PCT No.: PCT/JP2021/035481
§ 371 (c)(1),
(2) Date: Dec. 12, 2023

(87) PCT Pub. No.: WO2023/053158
PCT Pub. Date: Apr. 6, 2023

(65) Prior Publication Data
US 2024/0275733 A1    Aug. 15, 2024

(51) Int. Cl.
*H04L 47/32* (2022.01)
*H04L 47/31* (2022.01)

(52) U.S. Cl.
CPC .............. *H04L 47/32* (2013.01); *H04L 47/31* (2013.01)

(58) Field of Classification Search
CPC ............. H04L 43/0852; H04L 43/0829; H04L 65/1069; H04L 45/28; H04L 43/16;
(Continued)

(56) References Cited

U.S. PATENT DOCUMENTS 8,789,135 B1 *  7/2014  Pani ................... H04L 63/0209
                                                             726/13
2003/0112811 A1 *  6/2003  Hadi Salim ............. H04L 61/00
                                                             370/401
(Continued)

FOREIGN PATENT DOCUMENTS

JP    2009-159231 A    7/2009
JP    2013/157582 A1   10/2013

OTHER PUBLICATIONS

International Search Report of the International Searching Authority mailed Nov. 22, 2021 in corresponding International Application No. PCT/JP2021/035481 (and English translation).
(Continued)

*Primary Examiner* — Djenane M Bayard
(74) *Attorney, Agent, or Firm* — Posz Law Group, PLC

(57) ABSTRACT

A communication system includes a cloud server, and a communication control apparatus to be connected to the cloud server and a device through a wide area network and a local area network. The communication control apparatus transmits a device message generated by the device to the cloud server. The communication control apparatus includes a message acquirer that acquires the device message from the device, a determiner that determines whether the device message satisfies a non-transmission condition, and a transmission controller that controls transmission of the device message to the cloud server. The transmission controller discards the device message to avoid transmission of the device message to the cloud server when the device message is determined to satisfy the non-transmission condition.

20 Claims, 9 Drawing Sheets

(58) Field of Classification Search
CPC ....... H04L 43/087; H04L 45/22; H04L 65/80; H04L 47/10; H04L 41/5003; H04L 63/20; H04L 63/1425; H04L 63/0236; H04L 45/304; H04L 63/0227; H04L 65/1101; H04L 12/66; H04L 41/22; H04L 63/0263; H04L 45/00; H04L 47/32; H04L 63/08; H04L 41/5009; H04L 47/12; H04L 47/805; H04L 41/0631; H04L 43/062; H04L 43/50; H04L 65/1104; H04L 41/0896; H04L 43/04; H04L 43/0847; H04L 51/212; H04L 63/102; H04L 63/1408; H04L 69/16; H04L 41/0213; H04L 51/08; H04L 51/18; H04L 51/234; H04L 45/74; H04L 12/4641; H04L 45/66; H04L 12/4633; H04L 2101/622; H04L 61/103; H04L 45/12; H04L 12/4675; H04L 45/24; H04L 45/50; H04L 12/4625; H04L 12/4666; H04L 45/02; H04L 45/16; H04L 45/586; H04L 45/745; H04L 61/58; H04L 12/1886; H04L 12/413; H04L 12/465; H04L 45/54; H04L 61/25; H04L 61/59; H04L 12/00; H04L 12/18; H04L 2101/604; H04L 2101/659; H04L 45/245; H04L 45/42; H04L 45/566; H04L 61/2596; H04L 61/4511; H04L 61/5014; H04L 41/0894; H04L 43/026; H04L 69/22; H04L 63/1433; H04L 47/2441; H04L 63/145; H04L 43/0876; H04L 43/045; H04L 43/20; H04L 41/40; H04L 63/1416; H04L 47/20; H04L 61/5007; H04L 43/0888; H04L 43/12; H04L 47/2483; H04L 43/10; H04L 63/0876; H04L 63/1466; H04L 67/51; H04L 67/10; H04L 41/046; H04L 63/10; H04L 63/1441; H04L 41/0816; H04L 41/16; H04L 41/0806; H04L 63/1458; H04L 43/0864; H04L 67/12; H04L 45/38

See application file for complete search history.

(56) References Cited

U.S. PATENT DOCUMENTS

| | | | | |
|---|---|---|---|---|
| 2005/0243717 | A1* | 11/2005 | Stieglitz | H04L 63/0245 370/229 |
| 2010/0251329 | A1* | 9/2010 | Wei | H04L 67/1001 726/1 |
| 2018/0167279 | A1 | 6/2018 | Wang et al. | |

OTHER PUBLICATIONS

PCT Written Opinion of the International Search Authority dated Nov. 22, 2021 in the corresponding International Application No. PCT/JP2021/035481 (and English translation).

Aoyama et al., Novel User Experiences by Smart Home Appliances Connected to Smartphone and Cloud Backend, IEICE Technical Report CNR2013-20, Oct. 10, 2013, vol. 113. No. 248, pp. 49-52, p. 50, left column, line 6 to right column, line 34.

Extended European Search Report dated Oct. 23, 2024 issued for the corresponding European Patent Application No. 21959211.0.

* cited by examiner

FIG. 4

CONDITION STORAGE 131

| CONDITION INDENTIFIER INFORMATION | CONDITION INFORMATION | | | |
|---|---|---|---|---|
| | IP ADDRESS | SOURCE CLASS | MESSAGE | DESTINATION CLASS |
| IDC[0] | 192.168.11.2 | - | - | 0x0EF001, 0x05FF01 |
| IDC[1] | 192.168.11.2 | - | 0x73 | 0x0EF001, 0x05FF01 |
| IDC[2] | 192.168.11.2 | 0x013001 | - | 0x0EF001, 0x05FF01 |
| IDC[3] | 192.168.11.2 | 0x013001 | 0x73 | 0x0EF001, 0x05FF01 |

FIG. 5

CONDITION STORAGE 233

| TRAFFIC VOLUME CONDITION | PROCESSING LOAD CONDITION | CONDITION INDENTIFIER INFORMATION | CONDITION INFORMATION | | | |
|---|---|---|---|---|---|---|
| | | | IP ADDRESS | SOURCE CLASS | MESSAGE | DESTINATION CLASS |
| $Tr1 \leq Tr < Tr2$ | $L1 \leq L < L2$ | IDC[0] | 192.168.11.2 | - | - | ... |
| | | IDC[1] | 192.168.11.2 | - | 0x73 | ... |
| | | IDC[2] | 192.168.11.2 | 0x013001 | - | ... |
| | | IDC[3] | 192.168.11.2 | 0x013001 | 0x73 | ... |
| $Tr < Tr1$ | - | ⋮ | ⋮ | ⋮ | ⋮ | ⋮ |
| $Tr2 \leq Tr$ | - | ⋮ | ⋮ | ⋮ | ⋮ | ⋮ |
| - | $L < L1$ | ⋮ | ⋮ | ⋮ | ⋮ | ⋮ |
| - | $L2 \leq L$ | ⋮ | ⋮ | ⋮ | ⋮ | ⋮ |

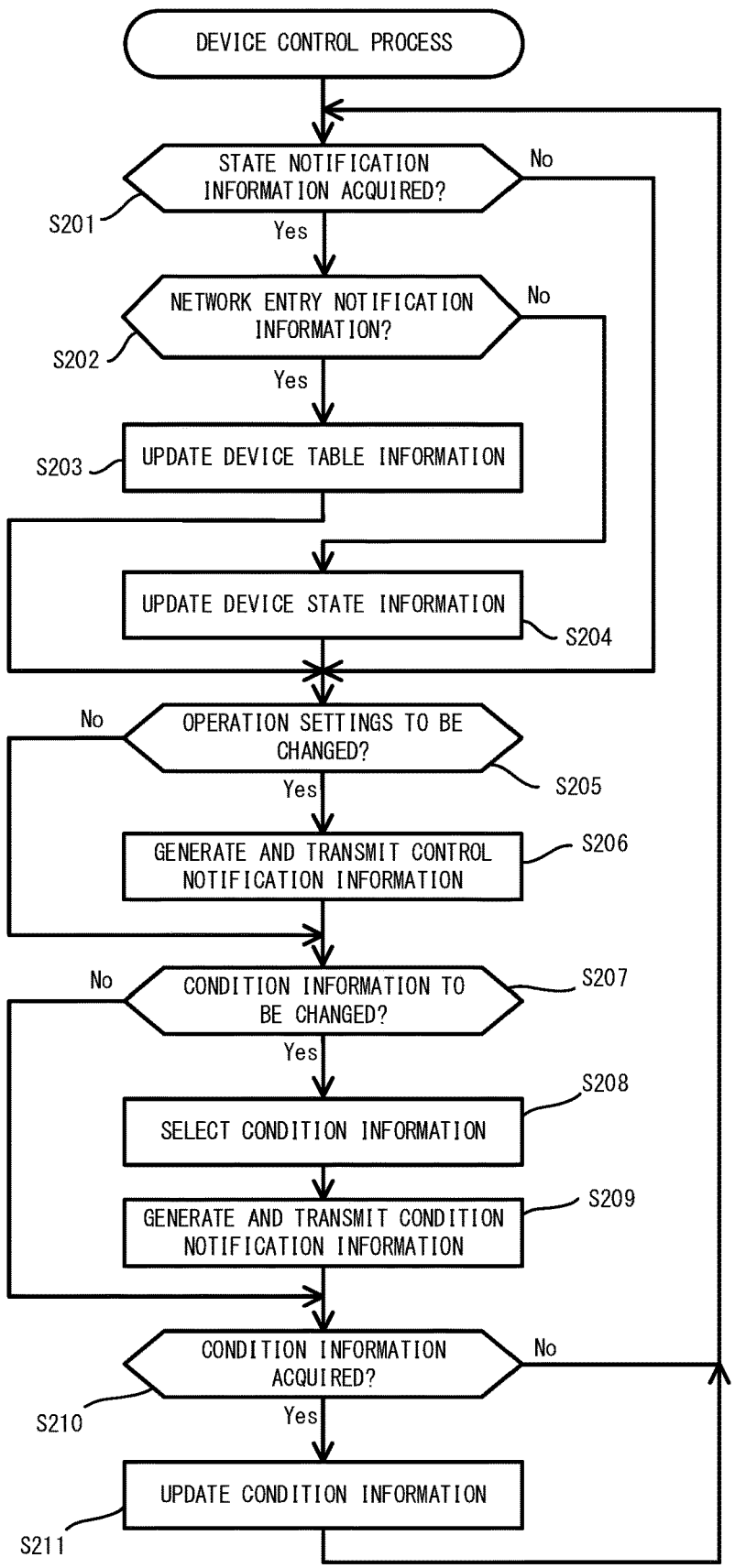

COMMUNICATION SYSTEM, COMMUNICATION CONTROL APPARATUS, COMMUNICATION CONTROL METHOD, AND RECORDING MEDIUM

CROSS-REFERENCE TO RELATED APPLICATION

This application is a U.S. National Stage Application of International Patent Application No. PCT/JP2021/035481 filed on Sep. 28, 2021, the contents of which are incorporated herein by reference.

TECHNICAL FIELD

The present disclosure relates to a communication system, a communication control apparatus, a communication control method, and a program.

BACKGROUND

A message processor includes a receiver that receives a message from a network, a selector that inspects the message received from the receiver and discards any message satisfying a predetermined condition, a converter that converts the message received from the selector, and a computator (see, for example, Patent Literature 1). The computator processes the message received from the converter through a predetermined application program.

PATENT LITERATURE

Patent Literature 1: International Publication No. WO 2013/157582

When a message processor as described in Patent Literature 1 is connected to a device through a network and processes a message transmitted from the device, the traffic volume on the network is to be reduced by preventing the device from transmitting a message satisfying a predetermined condition and thus to be discarded.

SUMMARY

In response to the above circumstances, an objective of the present disclosure is to provide a communication system, a communication control apparatus, a communication control method, and a program that can reduce the traffic volume on the network.

To achieve the above objective, a communication system according to an aspect of the present disclosure includes a server, and a communication control apparatus to be connected to the server and a device through a network. The communication control apparatus transmits a device message generated by the device to the server through the network. The communication control apparatus includes a message acquirer that acquires the device message from the device, a determiner that determines whether the device message satisfies a non-transmission condition, the non-transmission condition being satisfied by a non-transmission device message not to be transmitted to the server and being defined based on a set of IP address information and at least one of source class information, detail information, or destination class information included in the non-transmission device message, and a transmission controller that controls transmission of the device message to the server. The transmission controller discards the device message to avoid transmission of the device message to the server when the device message is determined to satisfy the non-transmission condition.

In the communication system according to the above aspect of the present disclosure, the determiner determines whether a device message is a non-transmission device message not to be transmitted to the server, and when the device message is determined to satisfy the non-transmission condition, the transmission controller discards the device message to avoid transmission of the device message to the server. This prevents non-transmission device message from being transmitted to the network, thus reducing the traffic volume on the network.

DETAILED DESCRIPTION

FIG. 4 is a table illustrating example information stored in a condition storage in a communication control apparatus according to the embodiment;

FIG. 5 is a table illustrating example information stored in a condition storage in a cloud server in the embodiment;

FIG. 9 is a flowchart illustrating an example process of device control performed by the cloud server in the embodiment.

DESCRIPTION OF EMBODIMENTS

A communication system according to an embodiment of the present disclosure is described below with reference to the accompanying drawings. The communication system according to the present embodiment includes a server, and a communication control apparatus connected to the server and a device through a network to transmit a device message generated by the device to the server through the network. The communication control apparatus includes a message acquirer that acquires the device message from the device, a determiner that determines whether the device message satisfies a non-transmission condition satisfied by a non-transmission device message not to be transmitted to the server, and a transmission controller that controls transmission of the device message to the server. When the device message is determined to satisfy the non-transmission condition, the transmission controller discards the device message to avoid transmission of the device message to the server.

Figure 1:
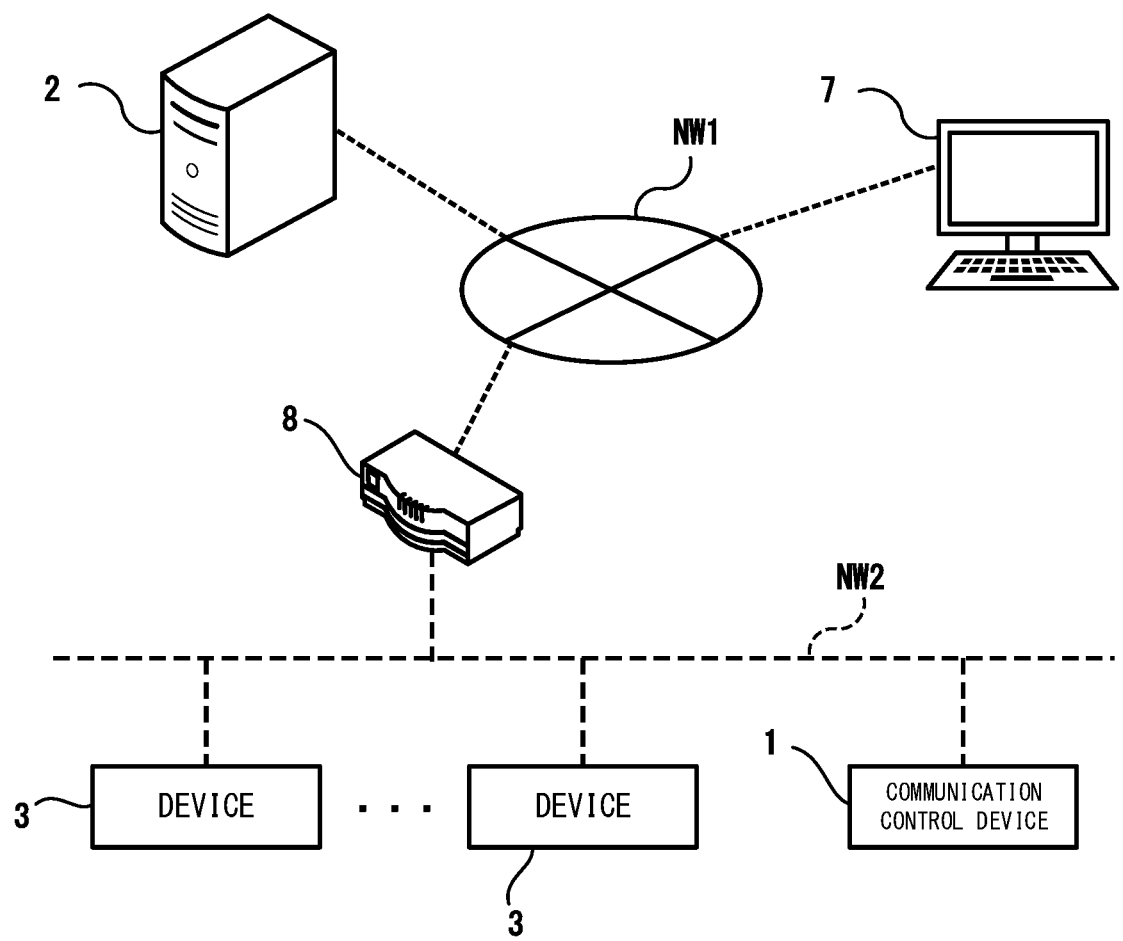
FIG. 1 is a schematic diagram of a communication system according to an embodiment of the present disclosure.

As illustrated in, for example, FIG. 1, the communication system according to the present embodiment includes a cloud server 2, devices 3 each installed in a home, and a communication control apparatus 1 that transmits a device message generated by the device 3 to the cloud server 2. The devices 3 and the communication control apparatus 1 can communicate with one another through a local area network NW2, such as a wireless local area network (LAN). The cloud server 2 can communicate through a wide area network NW1, such as the Internet and a broadband router (hereafter referred to as BBR) 8. The wide area network NW1 is also connected to a user-owned terminal 7. The device 3 is, for example, an air conditioner including a wireless module and communicates with the BBR 8 and the communication control apparatus 1 through the local area network NW2.

Each device 3 is, for example, an air conditioner including a wireless module and uses communication middleware, such as ECHONET Lite (registered trademark), to communicate with the communication control apparatus 1 through the local area network NW2. The device 3 generates device state information including state parameter information indicating, for example, the state of the device 3 after each change in the state and transmits the generated information to the communication control apparatus 1. In addition, when first connected to the local area network NW2, the device 3 generates network entry notification information about the connection to the local area network NW2 and transmits the generated information to the communication control apparatus 1. The network entry notification information includes MAC address information about each of the device 3 and the communication control apparatus 1 connected to the local area network NW2 to which the device 3 is connected, and IP address information about the device 3. The device 3 also updates the operation settings based on control information transmitted from the communication control apparatus 1. After updating the operation settings, the device 3 further transmits update completion notification information about the completed update of the operation settings to the communication control apparatus 1. The update completion notification information includes device state information indicating the state of the device 3 after the operation settings are updated.

The terminal 7 is, for example, a personal computer. When the user activates an application for recording new condition information (described later) and performs an operation for recording new condition information, the terminal 7 transmits the new condition information to be recorded to the cloud server 2. The terminal 7 also generates operation setting changing information as a command for changing the operation settings of the device 3 in accordance with the user's operation and transmits the generated information to the cloud server 2. The terminal 7 may not be a personal computer but may be any device that can connect to a network and activate an application, such as a tablet or a smartphone.

Figure 2:
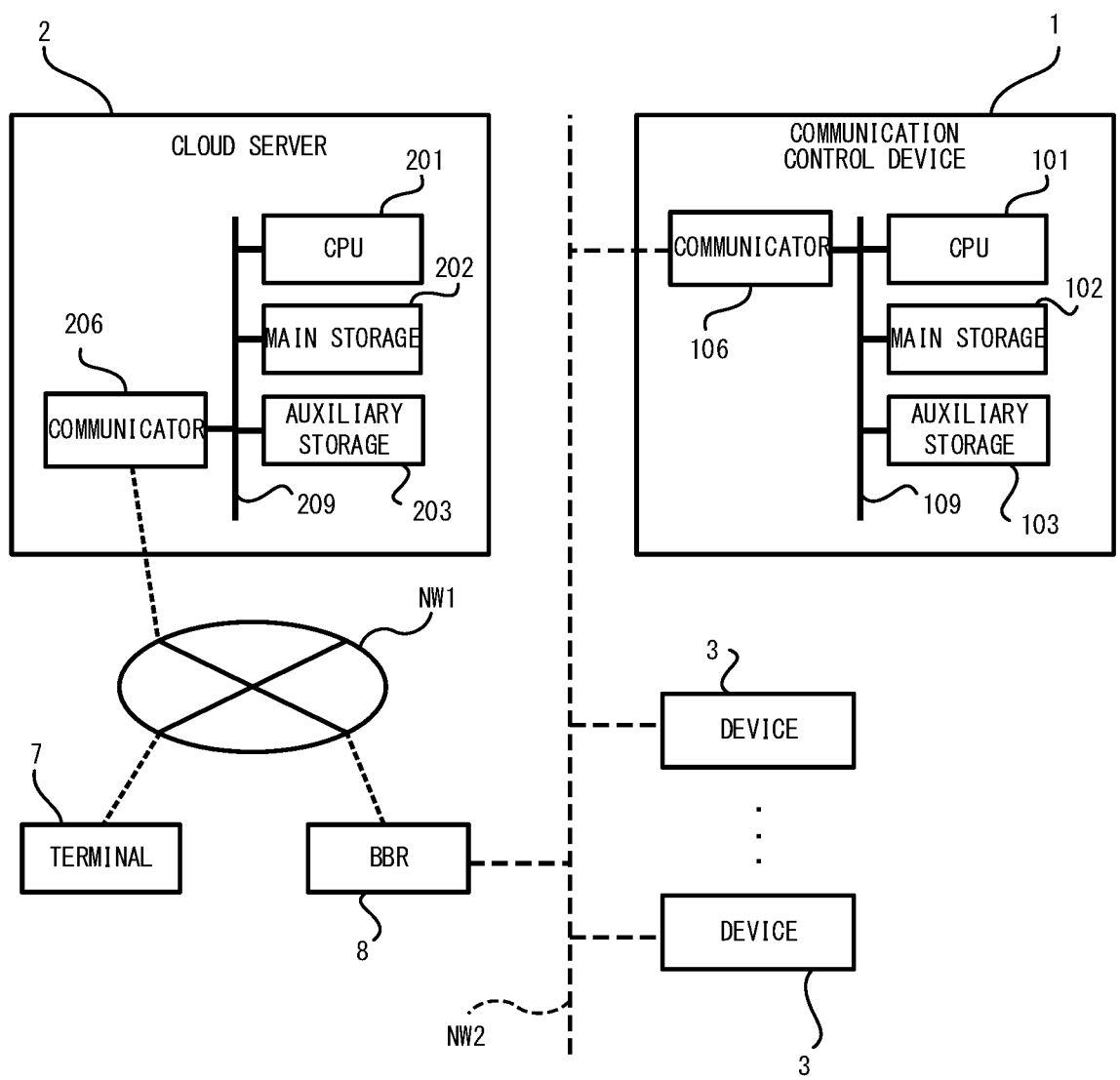
FIG. 2 is a block diagram of the communication system according to the embodiment, illustrating the hardware configuration.

The communication control apparatus 1 transmits a device message generated by the devices 3 to a server through a network. As illustrated in FIG. 2, the communication control apparatus 1 includes a central processing unit (CPU) 101, a main storage 102, an auxiliary storage 103, a communicator 106, and a bus 109 that connects the components. The main storage 102 is a volatile memory, such as a random-access memory (RAM), and used as a work area for the CPU 101. The auxiliary storage 103 includes a nonvolatile memory, such as a semiconductor memory, and functions as a read-only memory (ROM) or a storage to store programs for implementing the functions of the communication control apparatus 1. The communicator 106 includes, for example, a wireless module and wirelessly communicates with the devices 3 and the BBR 8.

Figure 3:
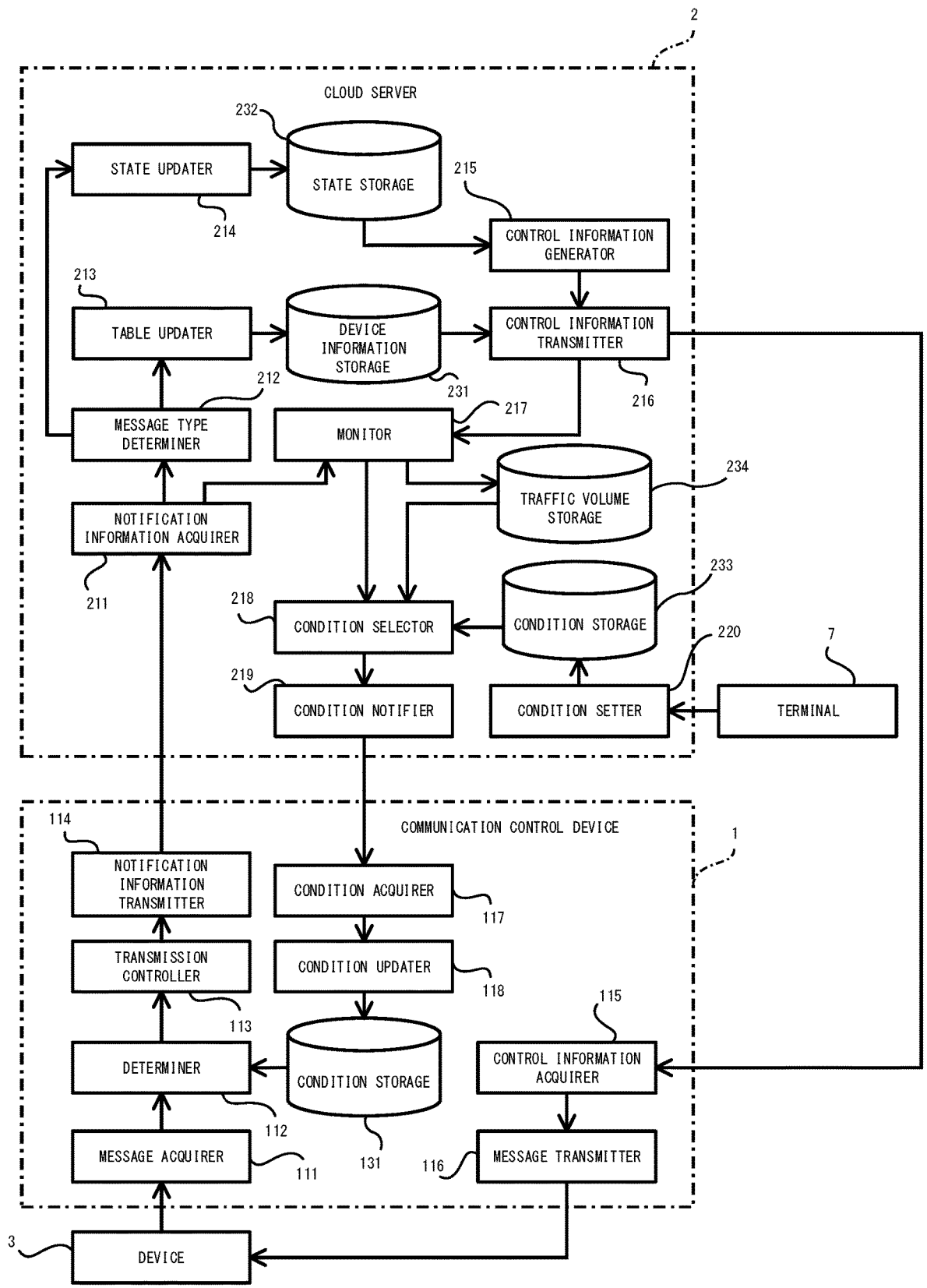
FIG. 3 is a functional block diagram of the communication system according to the embodiment.

In the communication control apparatus 1, the CPU 101 loads programs stored in the auxiliary storage 103 into the main storage 102 and executes the programs to, as illustrated in FIG. 3, function as a message acquirer 111, a determiner 112, a transmission controller 113, a notification information transmitter 114, a control information acquirer 115, a message transmitter 116, a condition acquirer 117, and a condition updater 118. As illustrated in FIG. 3, the auxiliary storage 103 illustrated in FIG. 2 includes a condition storage 131. The condition storage 131 is a first condition storage that stores condition information to be used to determine whether a device message transmitted from the device 3 satisfies a non-transmission condition satisfied by a non-transmission device message not to be transmitted to the cloud server 2. As illustrated in FIG. 4, for example, the condition storage 131 stores the condition information indicating non-transmission conditions based on a set of IP address information, source class information, detail information, and destination class information included in a device message transmitted from the device 3 in association with condition identifier information that identifies the conditions. The source class information indicates the class defined in ECHONET Lite (registered trademark) including the device 3 that is the source of a device message. The detail information indicates a device message detail defined in ECHONET Lite (registered trademark) and includes the device message as any one of information about a request to the destination, information about a response to a request from the destination, or information simply including notification to the destination. The destination class information indicates the class defined in ECHONET Lite (registered trademark) including the communication control apparatus 1 that is the destination of a device message. In the example illustrated in FIG. 4, the non-transmission condition identified by condition identifier information IDC[3] indicates that the destination has an IP address of 192.168.11.2, the device 3 belongs to the class 0x013001, or the air conditioner-related device class group, the device message has the detail of 0x73, or information as a notification of the parameter representing the state of the device 3, and the communication control apparatus 1 belongs to the class 0x0EF001 or 0x05FF01, or a profile class group or a management- or operation-related device class group.

Referring back to FIG. 3, the message acquirer 111 acquires a device message transmitted from the device 3 and forwards the acquired device message to the determiner 112. This device message is the network entry notification information or the device state information described above. The determiner 112 determines whether the device message forwarded from the message acquirer 111 satisfies the non-transmission condition described above. More specifically, the determiner 112 refers to the condition information stored in the condition storage 131 to determine whether the device message forwarded from the message acquirer 111 satisfies any non-transmission condition indicated by the condition information. The determiner 112 then forwards determination result information indicating the determination result to the transmission controller 113.

The transmission controller 113 controls the transmission of the device message to the cloud server 2. When the determiner 112 determines that the device message does not satisfy any of the above non-transmission conditions, the transmission controller 113 forwards the device message to the notification information transmitter 114. In contrast, when the determiner 112 determines that the device message satisfies any of the above non-transmission conditions, the transmission controller 113 discards the device message to avoid transmission of the device message to the cloud server 2. The notification information transmitter 114 generates state notification information by adding the MAC address information about the communication control apparatus 1 to the device message received from the transmission controller 113, encapsulating the resultant information, and adding header information specifying the cloud server 2 as the destination. The header information includes, for example, domain name information about the cloud server 2. The notification information transmitter 114 then transmits the generated state notification information to the cloud server 2.

When acquiring control notification information destined for the communication control apparatus 1 from the cloud server 2, the control information acquirer 115 removes header information from the acquired control notification information and then decapsulates the resultant information to extract control information including the MAC address information about the device 3 and the MAC address information about the communication control apparatus 1. The control information acquirer 115 then forwards the extracted control information to the message transmitter 116. Based on the MAC address information about the device 3 included in the control information forwarded from the control information acquirer 115, the message transmitter 116 transmits the extracted control information to the device 3.

When acquiring condition notification information transmitted from the cloud server 2, the condition acquirer 117 removes header information from the acquired condition notification information, decapsulates the resultant information to extract condition information, and forwards the extracted condition information to the condition updater 118. When receiving the condition information from the condition acquirer 117, the condition updater 118 uses the received condition information to update the condition information stored in the condition storage 131.

Referring back to FIG. 2, the cloud server 2 includes a CPU 201, a main storage 202, an auxiliary storage 203, a communicator 206, and a bus 209 that connects the components. The CPU 201 is, for example, a multicore processor. The main storage 202 is a volatile memory and used as a work area for the CPU 201. The auxiliary storage 203 includes a nonvolatile memory and functions as a ROM or a storage to store programs for implementing the functions of the cloud server 2. The communicator 206 communicates with the communication control apparatus 1 through the wide area network NW1 and the BBR 8.

In the cloud server 2, the CPU 201 loads programs stored in the auxiliary storage 203 into the main storage 202 and executes the programs to, as illustrated in FIG. 3, function as a notification information acquirer 211, a message type determiner 212, a table updater 213, a state updater 214, a control information generator 215, a control information transmitter 216, a monitor 217, a condition selector 218, a condition notifier 219, and a condition setter 220. As illustrated in FIG. 3, the auxiliary storage 203 illustrated in FIG. 2 includes a device information storage 231, a state storage 232, a condition storage 233, and a traffic volume storage 234. The device information storage 231 stores device table information that associates the MAC address information about the device 3 with the MAC address information about the communication control apparatus 1 connected to the local area network NW2 to which the device 3 belongs. The device information storage 231 also stores the IP address information provided to multiple devices 3, with each item of IP address information associated with the MAC address information about the corresponding device 3.

The state storage 232 stores device state information indicating the states of the devices 3, with each item of device state information associated with the MAC address information and the IP address information about the corresponding device 3. As illustrated in FIG. 5, for example, the condition storage 233 is a second condition storage to store multiple items of condition information with each item of condition information associated with the corresponding set of traffic volume condition information and processing load condition information. The traffic volume condition information indicates conditions for the traffic volume between the cloud server 2 and the communication control apparatus 1. The processing load condition information indicates conditions for the processing load on the cloud server 2. In the example illustrated in FIG. 5, when the traffic volume between the cloud server 2 and the communication control apparatus 1 is a traffic volume Tr greater than or equal to a traffic volume threshold Tr1 and less than a traffic volume threshold Tr2, the items of condition information corresponding to condition identifier information IDC[0], IDC[1], IDC[2], and IDC[3] are used. Referring back to FIG. 3, the traffic volume storage 234 stores traffic volume information indicating the traffic volume between the cloud server 2 and the communication control apparatus 1, with the traffic volume information associated with the IP address information about the corresponding communication control apparatus 1.

Referring back to FIG. 3, when acquiring state notification information transmitted from the communication control apparatus 1, the notification information acquirer 211 decapsulates the acquired state notification information and removes the header information to extract a device message including the MAC address information about the device 3. The notification information acquirer 211 then forwards the extracted device message to the message type determiner 212. The notification information acquirer 211 also forwards, to the monitor 217, the number of items of state notification information acquired per preset unit time and the size of each item of state notification information.

The message type determiner 212 determines whether the device message received from the notification information acquirer 211 is the network entry notification information described above. When determining that the device message is the network entry notification information, the message type determiner 212 forwards the network entry notification information to the table updater 213. In contrast, when determining that the device message is device state information, the message type determiner 212 forwards the device state information to the state updater 214. When receiving the network entry notification information from the message type determiner 212, the table updater 213 extracts the MAC address information and the IP address information about the device 3 from the network entry notification information, and stores the extracted information into the device information storage 231. When receiving the device state information from the message type determiner 212, the state updater 214 uses the received device state information to update the device state information stored in the state storage 232.

The control information generator 215 refers to the device state information stored in the state storage 232 to determine, based on the state of the device 3 indicated by the device state information, whether the operation settings of the device 3 are to be changed. When determining that the operation settings of the device 3 are to be changed, the control information generator 215 generates control information for changing the operation settings of the device 3 and forwards the generated control information to the control information transmitter 216. The control information transmitter 216 generates control notification information by encapsulating the control information received from the control information generator 215 and adding header information specifying the communication control apparatus 1 as the destination. The header information includes the IP address information and the MAC address information about the communication control apparatus 1. The control information transmitter 216 identifies the MAC address information and the IP address information about the communication control apparatus 1 associated with the set of MAC address information and the IP address information stored in the device information storage 231 about the device 3 to which the control information is transmitted, and incorporates the identified MAC address information and IP address information into the header information. The control information transmitter 216 also forwards, to the monitor 217, the number of items of control notification information transmitted to the communication control apparatus 1 per unit time above and the size of each item of control notification information.

The monitor 217 calculates the traffic volume per unit time above based on the notification from the notification information acquirer 211 representing the number of items of state notification information acquired per unit time above and the size of each item of state notification information, and on the notification from the control information transmitter 216 representing the number of items of control notification information transmitted to the communication control apparatus 1 per unit time above and the size of each item of control notification information. When the source IP address information about the state notification information is the same as the destination IP address information about the control notification information, the monitor 217 calculates the sum of the product of the size and the number of items of state notification information and the product of the size and the number of items of control notification information as the traffic volume between the cloud server 2 and the communication control apparatus 1 corresponding to the IP address information. The monitor 217 stores traffic volume information indicating the calculated traffic volume into the traffic volume storage 234, with the traffic volume information associated with the IP address information about the corresponding communication control apparatus 1. The monitor 217 also calculates the processing load value indicating the throughput of the cloud server 2 per unit time above. The monitor 217 then forwards the calculated processing load value to the condition selector 218.

The condition selector 218 selects, from the multiple items of condition information stored in the condition storage 233, an item of condition information associated with the traffic volume condition and the processing load condition satisfied by the traffic volume indicated by the traffic volume information stored in the traffic volume storage 234 and the processing load value received from the monitor 217. The condition selector 218 then forwards the selected condition information to the condition notifier 219. When selecting condition information based simply on the traffic volume condition, the condition selector 218 forwards the condition information and also the IP address information about the corresponding communication control apparatus 1 to the condition notifier 219. The condition notifier 219 generates condition notification information by encapsulating the condition information received from the condition selector 218 and adding header information specifying the communication control apparatus 1 as the destination, and transmits the generated condition notification information to the communication control apparatus 1. When simply receiving the condition information from the condition selector 218, the condition notifier 219 multicasts the generated condition notification information to all communication control apparatus 1 that can communicate with the cloud server 2. In contrast, when receiving the condition information together with the IP address information about the communication control apparatus 1 from the condition selector 218, the condition notifier 219 unicasts the generated condition notification information to the single communication control apparatus 1 corresponding to the received IP address information.

When acquiring at least one of condition information, communication condition information, or processing load condition information from the terminal 7, the condition setter 220 uses the acquired information to update at least one of the condition information, the communication condition information, or the processing load condition information stored in the condition storage 233.

Figure 6:
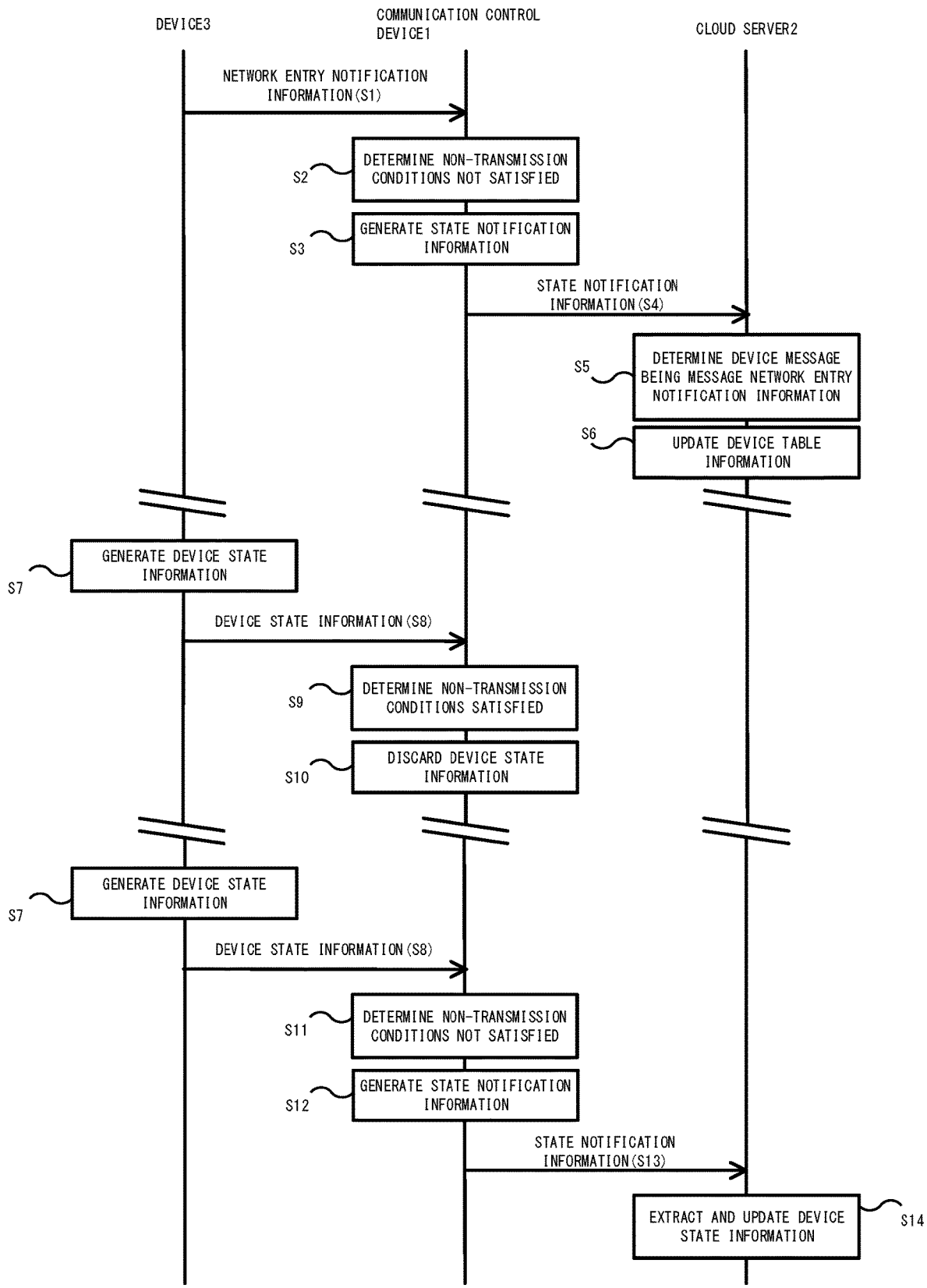
FIG. 6 is a sequence diagram illustrating the operation of the communication system according to the embodiment.
Figure 7:
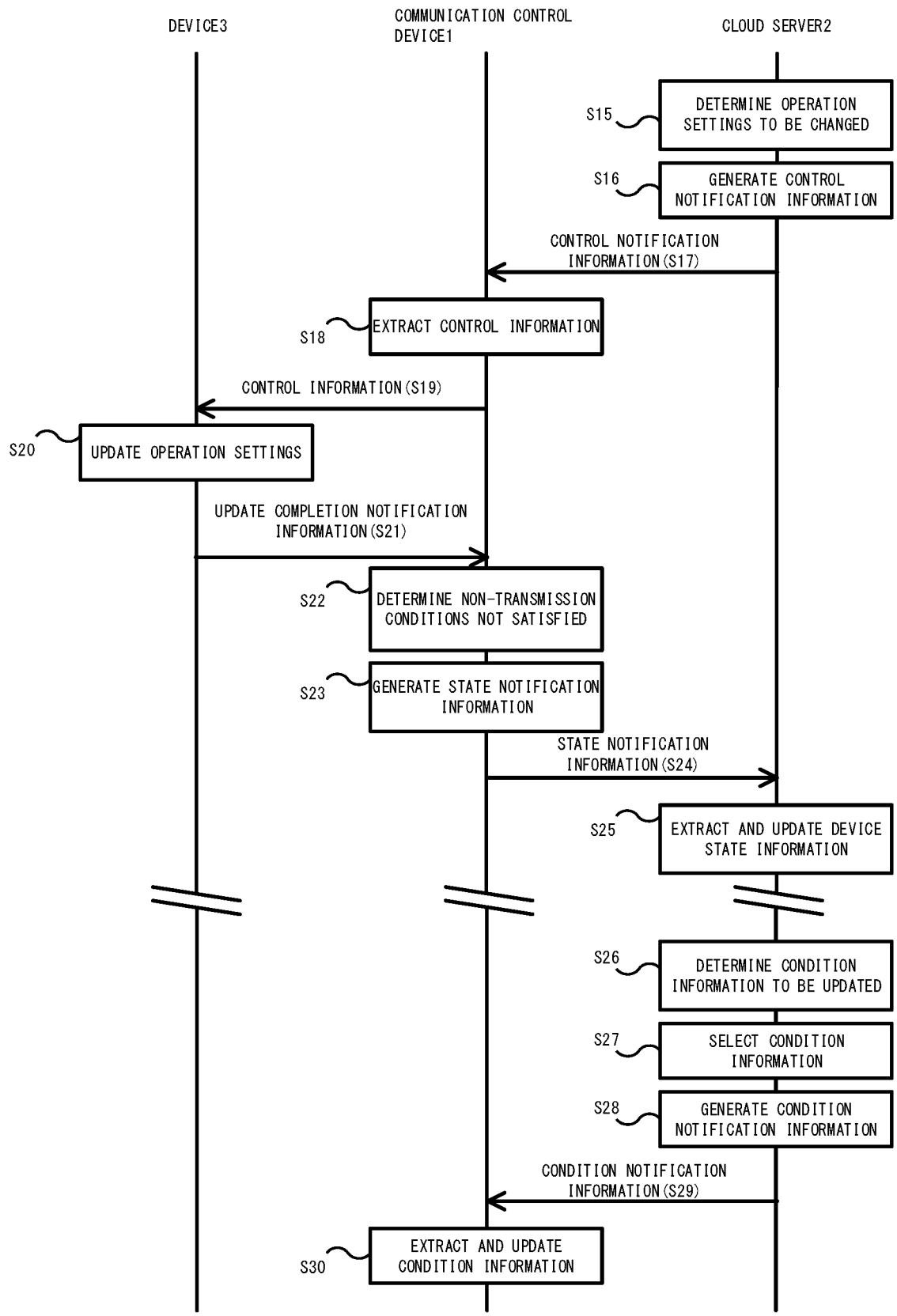
FIG. 7 is a sequence diagram illustrating the operation of the communication system according to the embodiment.

The operation of the communication system according to the present embodiment is described below with reference to FIGS. 6 and 7. The user performs a controlled device connection operation for newly connecting a device 3 to the local area network NW2. For a device 3 having a WPS button, the controlled device connection operation corresponds to, for example, pressing the WPS button. In this case, as illustrated in FIG. 6, network entry notification information is transmitted from the device 3 to the communication control apparatus 1 as a device message indicating the new connection of the device 3 to the local area network NW2 (step S1).

When acquiring the network entry notification information, the communication control apparatus 1 determines that the network entry notification information does not satisfy the non-transmission conditions described above (step S2). In this case, the communication control apparatus 1 generates state notification information by adding the MAC address information about the communication control apparatus 1 to the network entry notification information, encapsulating the resultant information, and adding header information specifying the cloud server 2 as the destination (step S3). The generated state notification information is then transmitted from the communication control apparatus 1 to the cloud server 2 (step S4). When receiving the state notification information, the cloud server 2 decapsulates the state notification information to extract the device message. The cloud server 2 determines that the device message is the network entry notification information (step S5), and uses the MAC address information and the IP address information about the device 3 included in the network entry notification information to update the device table information stored in the device information storage 231 (step S6).

After being connected to the local area network NW2, the device 3 generates device state information indicating the state of the device 3 (step S7). The generated device state information is transmitted from the device 3 to the communication control apparatus 1 (step S8). The communication control apparatus 1 may determine that the acquired device state information satisfies the non-transmission condition (step S9). In this case, the communication control apparatus 1 discards the acquired device state information (step S10).

After the above processing in steps S7 and S8 is performed, the communication control apparatus 1 may determine that the acquired device state information does not satisfy the non-transmission conditions (step S11). In this case, the communication control apparatus 1 generates state notification information by encapsulating the acquired device state information and adding header information specifying the cloud server 2 as the destination (step S12).

The generated state notification information is then transmitted from the communication control apparatus 1 to the cloud server 2 (step S13). When acquiring the state notification information transmitted from the communication control apparatus 1, the cloud server 2 decapsulates the state notification information to extract the device state information. The cloud server 2 then uses the extracted device state information to update the device state information stored in the state storage 232 (step S14). As illustrated in FIG. 7, the cloud server 2 may then determine that the operation settings of the device 3 are to be changed based on the updated device state information stored in the state storage 232 (step S15). In this case, the cloud server 2 generates control information for changing the settings of the device 3 determined to be changed and generates control notification information by encapsulating the generated control information and adding header information specifying the communication control apparatus 1 as the destination (step S16).

The generated control notification information is then transmitted from the cloud server 2 to the communication control apparatus 1 (step S17). When acquiring the control notification information transmitted from the cloud server 2, the communication control apparatus 1 decapsulates the acquired control notification information to extract the control information (step S18). The extracted control information is then transmitted from the communication control apparatus 1 to the device 3 (step S19). When acquiring the control information, the device 3 updates the operation settings based on the acquired control information (step S20). Update completion notification information is then transmitted from the device 3 to the communication control apparatus 1 to indicate the completed update of the operation settings in the device 3 (step S21).

When acquiring the update completion notification information, the communication control apparatus 1 determines that the above non-transmission conditions are not satisfied (step S22) and generates state notification information by encapsulating the device state information included in the update completion notification information and adding header information specifying the cloud server 2 as the destination (step S23). The generated state notification information is then transmitted from the communication control apparatus 1 to the cloud server 2 (step S24). When acquiring the state notification information, the cloud server 2 decapsulates the acquired state notification information to extract the device state information and uses the extracted device state information to update the device state information stored in the state storage 232 (step S25).

The cloud server 2 may determine that the condition information is to be updated based on at least one of the traffic volume between the cloud server 2 and the communication control apparatus 1 or the processing load on the cloud server 2 (step S26). In this case, the cloud server 2 selects, from the multiple items of condition information stored in the condition storage 233, an item of condition information associated with the communication condition and the processing load condition satisfied by at least one of the traffic volume or the processing load described above (step S27). The cloud server 2 then generates condition notification information by encapsulating the selected condition information and adding header information specifying the communication control apparatus 1 as the destination (step S28). The generated condition notification information is then transmitted from the cloud server 2 to the communication control apparatus 1 (step S29). When acquiring the condition notification information transmitted from the cloud server 2, the communication control apparatus 1 decapsulates the acquired condition notification information to extract the condition information and uses the extracted condition information to update the condition information stored in the condition storage 131 (step S30).

Figure 8:
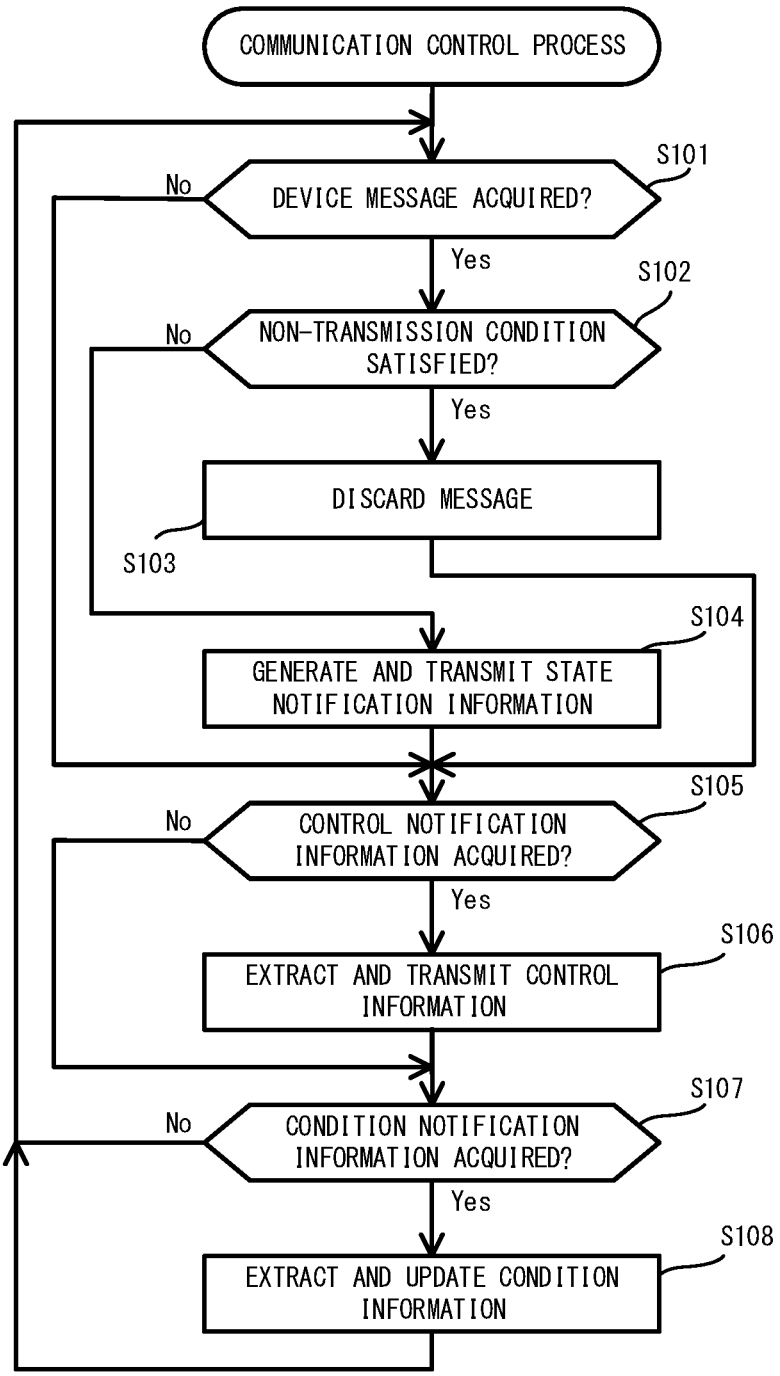
FIG. 8 is a flowchart illustrating an example process of communication control performed by the communication control apparatus according to the embodiment.

Communication control performed by the communication control apparatus 1 according to the present embodiment is described below with reference to FIG. 8. The communication control is started when, for example, the communication control apparatus 1 is powered on and placed at a site at which the communication control apparatus 1 is connectable to the local area network NW2. The message acquirer 111 first determines whether a device message transmitted from the device 3 is acquired (step S101). The device message corresponds to network entry notification information, device state information, or update completion notification information transmitted from the device 3. When the message acquirer 111 determines that no device message is acquired (No in step S101), the processing in step S105 (described later) is performed. In contrast, when determining that a device message transmitted from the device 3 is acquired (Yes in step S101), the message acquirer 111 forwards the acquired device message to the determiner 112. The determiner 112 then determines whether the device message satisfies the non-transmission condition described above (step S102). When the determiner 112 determines that the device message satisfies the non-transmission condition described above (Yes in step S102), the transmission controller 113 discards the device message (step S103). The subsequent processing in step S105 is performed. In contrast, when the determiner 112 determines that the device message does not satisfy the above non-transmission conditions (No in step S102), the transmission controller 113 forwards the device message to the notification information transmitter 114. The notification information transmitter 114 then generates state notification information by adding the MAC address information about the communication control apparatus 1 to the device message received from the transmission controller 113, encapsulating the resultant information, and adding header information specifying the cloud server 2 as the destination, and transmits the generated state notification information to the cloud server 2 (step S104).

The control information acquirer 115 then determines whether control notification information destined for the communication control apparatus 1 is acquired from the cloud server 2 (step S105). When the control information acquirer 115 determines that no control notification information transmitted from the cloud server 2 is acquired (No in step S105), the subsequent processing in step S107 is performed. In contrast, when determining that control notification information transmitted from the cloud server 2 is acquired (Yes in step S105), the control information acquirer 115 forwards the acquired control notification information to the message transmitter 116. The message transmitter 116 then removes header information from the control notification information received from the control information acquirer 115, decapsulates the resultant information to extract the control information, and transmits the extracted control information to the device 3 (step S106).

The condition acquirer 117 then determines whether condition notification information is acquired from the cloud server 2 (step S107). When the condition acquirer 117 determines that no condition notification information transmitted from the cloud server 2 is acquired (No in step S107), the processing in step S101 is performed again. In contrast, when determining that condition notification information transmitted from the cloud server 2 is acquired (Yes in step S107), the condition acquirer 117 forwards the acquired condition notification information to the condition updater 118. The condition updater 118 then removes header information from the condition notification information received from the condition acquirer 117, decapsulates the resultant information to extract the condition information, and uses the extracted condition information to update the condition information stored in the condition storage 131 (step S108). The processing in step S101 is then performed again.

Device control performed by the cloud server 2 in the present embodiment is described below with reference to FIG. 9. The device control is started when, for example, an application for performing the device control is activated in the cloud server 2. In parallel with the device control, for each preset unit time, the monitor 217 may calculate the traffic volume per unit time based on the number of items of state notification information and the size of each item of state notification information, and the number of items of control notification information and the size of each item of control notification information per unit time. The monitor 217 may store traffic volume information indicating the calculated traffic volume into the traffic volume storage 234, with the traffic volume information associated with the IP address information about the corresponding communication control apparatus 1. For each preset unit time, the monitor 217 may also calculate the processing load indicating the throughput of the cloud server 2 per unit time above and forwards the calculated processing load value to the condition selector 218. The notification information acquirer 211 first determines whether state notification information transmitted from the communication control apparatus 1 is acquired (step S201). When the notification information acquirer 211 determines that no state notification information is acquired (No in step S201), the processing in step S205 (described later) is performed. In contrast, when determining that the state notification information is acquired (Yes in step S201), the notification information acquirer 211 decapsulates the acquired state notification information to extract a device message and forwards the extracted device message to the message type determiner 212. The message type determiner 212 then determines whether the received device message is network entry notification information (step S202). When determining that the device message is the network entry notification information (Yes in step S202), the message type determiner 212 forwards the network entry notification information to the table updater 213. The table updater 213 then adds the MAC address information and the IP address information about the device 3 included in the network entry notification information to the device table information stored in the device information storage 231 to update the device table information (step S203). The processing in step S205 (described later) is then performed.

In contrast, when determining that the device message is the device state information (No in step S202), the message type determiner 212 forwards the device state information to the state updater 214. The state updater 214 then uses the received device state information to update the device state information stored in the state storage 232 (step S204). Based on the updated device state information stored in the state storage 232 or whether the operation setting changing information is acquired from the terminal 7, the control information generator 215 then determines whether the operation settings of the device 3 corresponding to the device state information are to be changed (step S205). When determining that the state of the device 3 indicated by the updated device state information stored in the state storage 232 is to be improved, or the operation setting changing information is acquired, the control information generator 215 determines that the operation settings of the device 3 are to be changed. When the control information generator 215 determines that the operation settings of the device 3 are not to be changed (No in step S205), the processing in step S207 (described later) is performed. In contrast, when determining that the operation settings of the device 3 are to be changed (Yes in step S205), the control information generator 215 generates control information for changing the operation settings of the device 3 and forwards the generated control information to the control information transmitter 216. The control information transmitter 216 then generates control notification information by encapsulating the control information received from the control information generator 215 and adding header information specifying the communication control apparatus 1 as the destination and transmits the generated control notification information to the communication control apparatus 1 (step S206).

The condition selector 218 then determines whether the condition information is to be changed, based on the traffic volume information stored in the traffic volume storage 234 and the processing load value of the cloud server 2 received from the monitor 217 (step S207). When the traffic volume indicated by the traffic volume information and the processing load do not satisfy the traffic volume condition and the processing load condition corresponding to the condition information applied in the communication control apparatus 1 among the traffic volume conditions and the processing load conditions stored in the condition storage 233, the condition selector 218 determines that the condition information is to be changed. When the condition selector 218 determines that the condition information is not to be changed (No in step S207), the processing in step S210 (described later) is performed. In contrast, when determining that the condition information is to be changed (Yes in step S207), the condition selector 218 selects, from the condition information stored in the condition storage 233, the condition information corresponding to the traffic volume condition and the processing load condition satisfied by the traffic volume and the processing load indicated by the traffic volume information (step S208). The condition selector 218 forwards the selected condition information to the condition notifier 219. The condition notifier 219 then generates condition notification information by encapsulating the received condition information and adding header information specifying the communication control apparatus 1 as the destination and transmits the generated condition notification information to the communication control apparatus 1 (step S209).

The condition setter 220 then determines whether the condition information transmitted from the terminal 7 is acquired (step S210). When the condition setter 220 determines that no condition information is acquired from the terminal 7 (No in step S210), the processing in step S201 is performed again. In contrast, when determining that the condition information transmitted from the terminal 7 is acquired (Yes in step S210), the condition setter 220 uses the acquired condition information to update the condition information stored in the condition storage 233 (step S211). The processing in step S201 is then performed again.

As described above, in the communication system according to the present embodiment, the determiner 112 determines whether a device message is a non-transmission device message not to be transmitted to the cloud server 2, and when the device message is determined to satisfy the non-transmission condition described above, the transmission controller 113 discards the device message to avoid transmission of the device message to the cloud server 2. This prevents state notification information including non-transmission device messages from being transmitted to the wide area network NW1, thus reducing the traffic volume on the wide area network NW1. The reduced traffic volume on the wide area network NW1 lowers the cost of using the wide area network NW1.

In the communication system according to the present embodiment, the condition notifier 219 in the cloud server 2 transmits condition information set by the condition setter 220 to the communication control apparatus 1, and the condition updater 118 in the communication control apparatus 1 updates the condition information stored in the condition storage 131 with the condition information acquired by the condition acquirer 117. This allows, for example, the user managing the cloud server 2 to reflect the condition information transmitted from the terminal 7 to the cloud server 2 to the condition information stored in the condition storage 131 in the communication control apparatus 1, thus allowing the user to easily regulate state notification information being transmitted to the wide area network NW1.

Additionally, the condition storage 233 in the cloud server 2 in the present embodiment stores multiple items of condition information, and the condition selector 218 selects an item of condition information from the multiple items of condition information stored in the condition storage 233. This eliminates generation of condition information each time the condition information is to be changed, thus improving the efficiency of processing in the cloud server 2.

The monitor 217 in the cloud server 2 in the present embodiment monitors the processing load on the cloud server 2 and the traffic volume between the cloud server 2 and the communication control apparatus 1 through the wide area network NW1, and the condition selector 218 selects condition information based on the traffic volume and the processing load on the cloud server 2. This allows condition information to be as appropriate for the processing load on the cloud server 2 and the traffic volume between the cloud server 2 and the communication control apparatus 1 through the wide area network NW1, thus allowing the device messages to be screened using appropriate non-transmission conditions.

Additionally, the destination of device messages transmitted from the device 3 in the present embodiment is determined to be the communication control apparatus 1. No information is transmitted directly from the device 3 to the cloud server 2, and all device messages transmitted from the device 3 are screened in the communication control apparatus 1, thus reducing the amount of state notification information being transmitted to the wide area network NW1.

Although the embodiment of the present disclosure is described above, the present disclosure is not limited to the above embodiment. For example, the communication control apparatus 1 may be a gateway device having the functions of the BBR 8 and connected to the wide area network NW1. In some embodiments, the communication system may include a communication control apparatus connected to the local area network NW2 and having some of the functions of the communication control apparatus 1 described in the embodiment, and a gateway device having the other of the functions of the communication control apparatus 1 described in the embodiment. Multiple communication control apparatuses 1 may be connected to the local area network NW2. This reduces the processing load on each communication control apparatus 1.

In the above embodiment, the user can use the terminal 7 connected to the wide area network NW1 to update the condition information stored in the condition storage 233 in the cloud server 2. However, in some embodiments, the communication system may include, for example, a terminal connected to the local area network NW2 and having the function of transmitting condition information entered by the user to the cloud server 2. In this case, the terminal transmits the condition information to the communication control apparatus 1, and the communication control apparatus 1 may encapsulate the condition information transmitted from the terminal and transmit the resultant state notification information to the cloud server 2. In the cloud server 2, when determining that the state notification information acquired from the communication control apparatus 1 is condition information, the message type determiner 212 may forward the condition information to the condition setter 220.

In the above embodiment, the user uses the terminal 7 to update the condition information stored in the condition storage 233. However, in some embodiments, the cloud server 2 may include an input device, and the user may update the condition information through the input device.

The functions of the communication control apparatus 1 and the cloud server 2 according to the present disclosure may be implemented by software, firmware, or a combination of software and firmware. In this case, the software or the firmware is written as programs, and the programs may be stored in a non-transitory computer-readable recording medium for distribution, such as a flexible disk, a compact disc ROM (CD-ROM), a digital versatile disc (DVD), a magneto-optical (MO) disk, or a flash memory. The programs may be installed in a computer to provide a computer that can implement the above functions. When the functions are shared by the operating system (OS) and applications or implemented through cooperation between the OS and applications, the programs other than the OS may be stored in the non-transitory recording medium.

The programs may also be superimposed on a carrier wave and distributed through a communication network. For example, the programs may be posted in a bulletin board system (BBS) on a communication network and distributed through the network. The programs may be started and executed similarly to other application programs under the control of the OS to perform the processing described above.

Industrial Applicability

The communication control apparatus according to one or more embodiments of the present disclosure is suitable as a control apparatus for a home energy management system (HEMS) installed in a home.

The invention claimed is:
1. A communication system, comprising:
a server; and
a communication control apparatus to be connected to the server through a wide area network and to at least one device of a home energy management system through a local area network, the communication control apparatus being configured to transmit a device message generated by the at least one device to the server through the wide area network, wherein
the communication control apparatus includes a processor configured to
acquire the device message from the at least one device, determine whether the device message satisfies a non-transmission condition, the non-transmission condition being satisfied by a non-transmission device message not to be transmitted to the server and being defined as corresponding to a set of IP address information and at least one of source class information or destination class information included in the non-transmission device message, wherein the source class information indicates a class of the at least one device that is a source of the device message and the destination class information indicates the class of the server, responsive to determining that the non-transmission condition is not the non-transmission device message, transmit the device message to the server, and responsive to determining that the non-transmission condition is the non-transmission device message, discard the device message.

2. The communication system according to claim 1, wherein
the server is configured to
transmit an item of condition information indicating the non-transmission condition to the communication control apparatus, and
the communication control apparatus further includes
a first condition storage to store an item of condition information to be used to determine whether the device message satisfies the non-transmission condition,
wherein the processor is further configured to
acquire the item of condition information transmitted from the server, and
responsive to acquiring the item of condition information, update the item of condition information stored in the first condition storage with the acquired item of condition information.

3. The communication system according to claim 2, wherein
the server further includes a second condition storage to store a plurality of items of condition information, and
the server is further configured to
select at least one item of condition information from the plurality of items of condition information stored in the second condition storage, and
transmit the selected at least one item of condition information to the communication control apparatus.

4. The communication system according to claim 3, wherein
the server further includes a monitor to monitor at least one of a traffic volume between the server and the communication control apparatus on the wide area network or a processing load on the server, and
the server is further configured to select the at least one item of condition information based on at least one of the traffic volume between the server and the communication control apparatus on the wide area network or the processing load on the server.

5. The communication system according to claim 4, wherein
a destination of the device message is determined to be the communication control apparatus.

6. The communication system according to claim 2, wherein
a destination of the device message is determined to be the communication control apparatus.

7. The communication system according to claim 3, wherein
a destination of the device message is determined to be the communication control apparatus.

8. The communication system according to claim 1, wherein
a destination of the device message is determined to be the communication control apparatus.

9. A communication control apparatus to be connected to a server through a wide area network and to at least one device of a home energy management system through a local area network, the communication control apparatus being configured to transmit a device message generated by the at least one device to the server through the wide area network, the communication control apparatus comprising:
a processor configured to
acquire the device message from the at least one device;
determine whether the device message satisfies a non-transmission condition, the non-transmission condition being satisfied by a non-transmission device message not to be transmitted to the server and being defined as corresponding to a set of IP address information and at least one of source class information or destination class information included in the non-transmission device message wherein the source class information indicates a class of the at least one device that is a source of the device message and the destination class information indicates the class of the server;
responsive to determining that the non-transmission condition is not the non-transmission device message, transmit the device message; and
responsive to determining that the non-transmission condition is the non-transmission device message, discard the device message.

10. A communication control method for a device message to be implemented by a communication control apparatus to be connected through a wide area network to a server and to at least one device through a local area network, the communication control apparatus being configured to transmit the device message generated by the at least one device to the server through the wide area network, the communication control method comprising:
acquiring, by the communication control apparatus, the device message from the at least one device;
determining, by the communication control apparatus, whether the device message satisfies a non-transmission condition, the non-transmission condition being satisfied by a non-transmission device message not to be transmitted to the server and being defined as corresponding to a set of IP address information and at least one of source class information or destination class information included in the non-transmission device message, wherein the source class information indicates a class of the at least one device that is a source of the device message and the destination class information indicates the class of the server;
responsive to determining that the non-transmission condition is not the non-transmission device message, transmitting the device message to the server; and
responsive to determining that the non-transmission condition is the non-transmission device message, by the communication control apparatus, discarding, by the communication control apparatus, the device message.

11. The communication control apparatus of claim 9, wherein
a destination of the device message is determined to be the communication control apparatus.

12. The communication control method according to claim 10, further comprising
- transmitting, by the server, an item of condition information indicating the non-transmission condition to the communication control apparatus, and
- storing, by the communication control apparatus in a first condition storage, an item of condition information to be used to determine whether the device message satisfies the non-transmission condition,
- acquiring, by the communication control apparatus, the item of condition information transmitted from the server, and
- responsive to acquiring the item of condition information, updating, by the communication control apparatus, the item of condition information stored in the first condition storage with the acquired item of condition information.

13. The communication control method according to claim 12, further comprising
- storing, by the server, in a second condition storage, a plurality of items of condition information,
- selecting, by the server, at least one item of condition information from the plurality of items of condition information stored in the second condition storage, and
- transmitting, by the server, the selected at least one item of condition information to the communication control apparatus.

14. The communication control method according to claim 13, further comprising
- monitoring, by the server, at least one of a traffic volume between the server and the communication control apparatus on the wide area network or a processing load on the server, and
- selecting, by the server, the at least one item of condition information based on at least one of the traffic volume between the server and the communication control apparatus on the wide area network or the processing load on the server.

15. The communication control method according to claim 14, further comprising
- determining, by the communication control apparatus, that a destination of the device message is the communication control apparatus.

16. The communication control method according to claim 12, further comprising
- determining, by the communication control apparatus, that a destination of the device message is the communication control apparatus.

17. The communication control method according to claim 13, further comprising
- determining, by the communication control apparatus, that a destination of the device message is the communication control apparatus.

18. The communication control method according to claim 10, further comprising
- determining, by the communication control apparatus, that a destination of the device message is the communication control apparatus.

19. A non-transitory recording medium storing a program, the program causing a computer to function as:
- a communication control apparatus to be connected to a server through a wide area network and to at least one device of a home energy management system through a local area network, the communication control apparatus being configured to transmit a device message generated by the at least one device to the server through the wide area network, wherein execution of the program causes the communication control apparatus to
- acquire, from the at least one device, the device message generated by the at least one device;
- determine whether the device message satisfies a non-transmission condition, the non-transmission condition being satisfied by a non-transmission device message not to be transmitted to the server and being defined as corresponding to a set of IP address information and at least one of source class information or destination class information included in the non-transmission device message, wherein the source class information indicates a class of the at least one device that is a source of the device message and the destination class information indicates the class of the server;
- responsive to determining that the non-transmission condition is not the non-transmission device message, transmit the device message to the server, and
- responsive to determining that the non-transmission condition is the non-transmission device message, discard the device message.

20. The non-transitory recording medium of claim 19, wherein
- a destination of the device message is determined to be the communication control apparatus.

* * * * *